Nov. 6, 1962     J. T. DE WITT     3,061,935
INSTRUMENT FOR DETERMINING ANGLES
Filed June 23, 1958
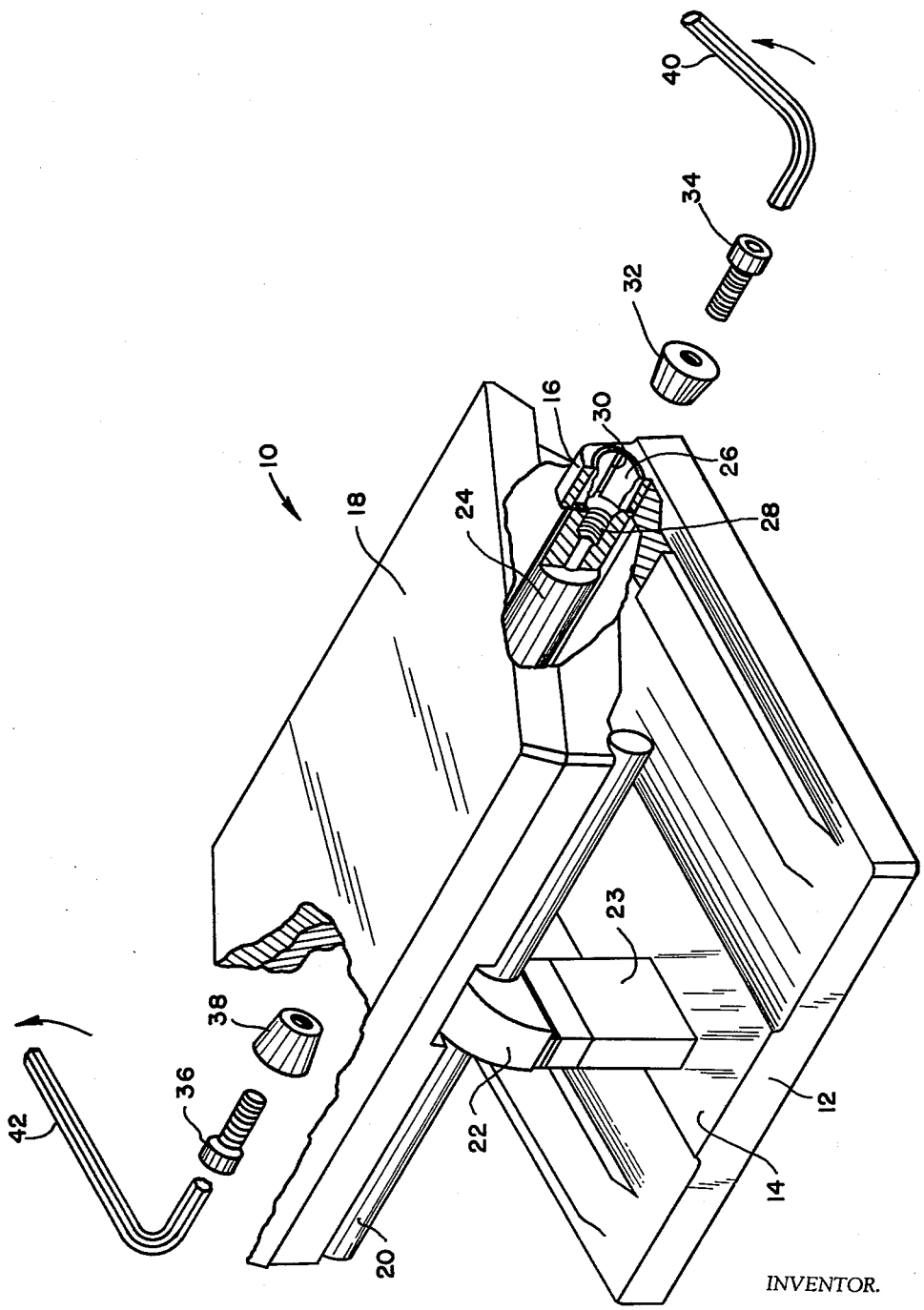
INVENTOR.
JAMES T. DEWITT
BY FINN G. OLSEN
ATTORNEY

United States Patent Office 3,061,935
Patented Nov. 6, 1962

3,061,935
INSTRUMENT FOR DETERMINING ANGLES
James T. De Witt, Detroit, Mich., assignor, by mesne assignments, to Ex-Cell-O Corporation, Detroit, Mich., a corporation of Michigan
Filed June 23, 1958, Ser. No. 743,712
4 Claims. (Cl. 33—174)

The present invention relates to an instrument for determining angles, and more particularly to such an instrument having improved means for locking the instrument accurately at selected angles.

Instruments of this type are used for supporting a workpiece at any predetermined angle while one or more operations are performed by machine tools on the workpiece or while angles on a precision workpiece are checked. An example of this type of instrument can be seen in the patent to Lovenston, No. 2,351,773, granted June 20, 1944.

As disclosed in the patent to Lovenston, two or more plates are utilized, the upper of which acts as the workpiece holding member and the other plates are pivotally connected thereto or to one another so that the workpiece holding plate can be inclined to any predetermined angle. For the purpose of disclosing the present invention, a single angle instrument utilizing only two plates will be described, but it will be understood that where compound angles are to be determined, three plates will be employed.

The prior art instruments of this type are set at a given angle in the following manner. Initially the operator looks up the required angle in a table of contents which normally is furnished with the instrument. This specifies the proper gage block or gage blocks that must be inserted between the unhinged end of the plates to produce the desired angle of inclination therebetween. The gage blocks are then inserted between the plates and the plates are then locked in place by any of various means provided in the prior art devices, after which the instrument is transferred to the work place where it is to be used.

The locking means used heretofore in the prior art devices have not proved to be entirely satisfactory. Some of the locking means have been difficult to handle and have been time consuming in setting. Others have been costly to make. Still others cause binding of the parts which ultimately impairs the accuracy of the instrument.

It is an object of the present invention to provide an improved instrument for determining angles which is constructed and arranged so that the measuring surfaces between which the angle is determined can be locked in place by the operator in an extremely simple manner and in which no undesirable binding or distorting of the component parts of the instrument will occur, nor will the gage blocks be loosened or released from contact with the plates of the instrument during the setting or using of the instrument.

It is still another object of the present invention to provide an improved instrument of the foregoing character wherein the locking means includes a pair of expanders for securing the pivoted parts together and said expanders are actuated by applying simultaneously equal torques in a direction tending to cause closing of the plates so that there will be no forces transmitted to the plates tending to urge them away from their set positions, nor will there be any forces transmitted to the shaft tending to twist or shear the same.

It is still another object of the present invention to provide an improved instrument of the foregoing character which contains locking means characterized by its simplicity and relatively low cost and its effectiveness in operation.

Other objects of this invention will appear in the following description and appended claims, reference being had to the accompanying drawings forming a part of this specification wherein like reference characters designate corresponding parts in the several views.

The drawing is an exploded perspective view with portions removed illustrating an instrument embodying the present instrument, and showing tools and gage blocks used in setting the instrument.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, a more detailed description of the invention will be given. The instrument or device for determining angles is indicated generally by the reference number 10. It includes a base plate 12 having on its upper side a precision finished surface 14 and at its rear edge a pair of upwardly extending supports 16, only one of which is shown. Positioned above the base plate 12 is an upper or top plate 18 which is pivotally connected to the base plate 12 in a manner to be described.

The forward, underside of the top plate 18 carries a conventional roll bar 20 on which is a swivel block 22. The under side of the swivel block 22 has a precision finished surface so that gage blocks 23 can be positioned between the swivel block 22 and the surface 14 of the base plate, thereby establishing an angular relationship between the upper and lower surfaces, respectively, of top plate 18 and base plate 12.

The top plate 18 and base plate 12 are pivotally connected together by the shaft or roll bar 24. The latter has its ends extending into the supports 16, and its intermediate portion is rigidly secured to the top plate 18 by suitable means, such as screws (not shown). The ends of the shaft 24 are journaled in the supports 16 so that the top plate 18 and the shaft 24 normally are free to pivot as a unit about the axis of the shaft 24.

The end of shaft 24 illustrated in the drawing will be described first. It is an integral unit with an axially extending hole, the axially outer end of which is a tapered portion 26 converging inward to a threaded portion 28. The tapered portion 26 has four slots 30 cut longitudinally therein so that the four segments of the tapered portion between the slots 30 can be expanded radially outwardly, thereby tightly engaging the inner surface of support 16 and preventing relative rotation of the shaft 24 in support 16. An annular tapered expander 32 fits into the tapered portion 26, and a left-hand socket head screw 34 fits through the hole in the expander 32 and is threadedly connected to the threaded portion 28.

The opposite end of shaft 24 is constructed the same as the end illustrated and described above, with one exception. The other end has a right-hand threaded portion, and the socket head screw 36 has a right-hand thread. The expander 38 is the same as the expander 32.

When it is desired to lock the plates 14 and 18 in the predetermined angular position, shown for example in the drawing, it is only necessary to insert the ends of wrenches 40 and 42 into the heads of screws 34 and 36 and turn the wrenches in the direction of the arrows. This will cause the screws 34 and 36 to be screwed axially inward, thereby forcing the expanders 32 and 38 inward with the result that the ends of shaft 24 are expanded and locked in supports 16. It is to be observed that this operation will assure that the plate 18 will be urged against the gage blocks 23 without causing any twisting or stressing of the instrument. Thus, uniformly accurate results will always be obtained from the instrument and the gage blocks will be retained firmly in place during use of the instrument.

The same locking means can be used with instruments for determining compound angles, and it is to be understood that the claims appearing herein apply equally to an instrument for determining single or compound angles.

Having thus described my invention, I claim:

1. A device for determining angles comprising a base plate having a precision finished surface on its upper side and a pair of upwardly extending supports with axially aligned openings, a shaft journaled in the openings in said supports, a top plate rigidly conected to said shaft between said supports for pivoting about the axis of said openings and having a roll bar parallel to said shaft and securely located at the opposite side of the top plate from the shaft, said roll bar carrying a swivel block above said precision finished surface so that gage blocks can be positioned between said surface and said swivel block for setting the top plate at a desired angle with respect to the base plate, said shaft terminating at the respective outer sides of said supports, each end of said shaft having an axially inward extending hole with a tapered portion terminating in a threaded portion, the tapered portion having longitudinal slots so that the tapered portion can be expanded radially outwardly locking the top plate at the desired angle, an annular locking cone fitting into each tapered portion and operable when urged into the tapered portion to expand the same, and a head screw extending through each locking cone and threadedly attached to said shaft by the respective threaded portions, the screw and its associated threaded portion in one end of the shaft being a left-hand thread and in the other end a right-hand thread so that the shaft can be locked in place simultaneously in the two supports while the top plate is urged at a uniform pressure against the gage blocks.

2. A device for determining angles comprising a first plate having a precision finished surface and a pair of upwardly extending supports with axially aligned openings, a shaft journaled in the openings in said supports, a second plate rigidly connected to said shaft between said supports for pivoting about the axis of said openings and carrying a swivel block above said precision finished surface so that gage blocks can be positioned between said surface and said swivel block for separating the plates at a desired angle, said shaft terminating at the respective outer sides of said supports, each end of said shaft having an axially inward extending hole with a tapered portion terminating in a threaded portion, the tapered portion having longitudinal slots so that the tapered portion can be expanded radially outwardly locking the plates at the desired angle, an annular locking cone fitting into each tapered portion and operable when urged into the tapered portion to expand the same, and a head screw extending through each locking cone and threadedly attached to said shaft by the respective threaded portions, the screw and its associated threaded portion in one end of the shaft being a left-hand thread and in the other end a right-hand thread so that the shaft can be locked in place simultaneously in the two supports by turning the screws in the direction tending to pivot the plates together.

3. A device for determining angles comprising first and second plates, one of said plates having a pair of supports with axially aligned openings, a shaft journaled in the openings in said supports, the other of said plates being rigidly connected to said shaft between said supports for pivoting about the axis of said openings, said plates having complementary finished surfaces having means of remaining parallel between which gage blocks can be positioned for keeping the plates separated at a desired angle, said shaft terminating at the respective outer sides of said supports, each end of said shaft having an axially inward extending hole with a tapered portion terminating in a threaded portion, the tapered portion having longitudinal slots so that the tapered portion can be expanded radially outwardly locking the plates at the desired angle, an annular locking cone fitting into each tapered portion and operable when urged into the tapered portion to expand the same, and a head screw extending through each locking cone and threadedly attached to said shaft by the respective threaded portions, the screw and its associated threaded portion in one end of the shaft being a left-hand thread and in the other end a right-hand thread so that the shaft can be locked in place simultaneously in the two supports by turning the screws in the direction tending to pivot the plates together.

4. A device for determining angles comprising first and second plates, the first of said plates having two supports with openings aigned axially, a shaft journaled in the openings of said supports, the second plate being connected to said shaft for turning with said shaft, said plates having complementary finished surfaces with means for retaining parallelism of said surfaces at all operating angles, between said surfaces gage blocks positioned for determining the angle between the plates, said journaled shaft terminating at the respective outer sides of said supports and having expansible ends for locking the shaft to said supports, said expansible ends having cone shaped bore surfaces with threaded portions at the apex of said cones concentric with the axis of the shaft and frustum shaped expanders having outer surfaces engageable with the said cone shaped bore surfaces, said expanders having a smooth center bore concentric with the threaded portion of the said expansible ends, threaded screw members placed through an expander and turned into threaded portions of said cone shaped bore surfaces expanding the expansible ends locking the plates in position, and said threaded system being so arranged that the threaded screw members must be rotated in a direction tending to move the two plates together.

References Cited in the file of this patent

UNITED STATES PATENTS

| | | |
|---|---|---|
| 1,706,206 | Alwill | Mar. 19, 1929 |
| 2,351,773 | Lovenston | June 20, 1944 |
| 2,376,959 | Christel | May 29, 1945 |
| 2,505,928 | Worby | May 2, 1950 |
| 2,733,702 | Barrett | Feb. 7, 1956 |